J. C. PHELPS.
OUTLET DEVICE FOR CONDUITS.
APPLICATION FILED MAR. 7, 1917.
1,294,155.
Patented Feb. 11, 1919.
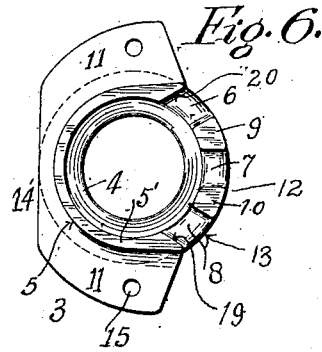
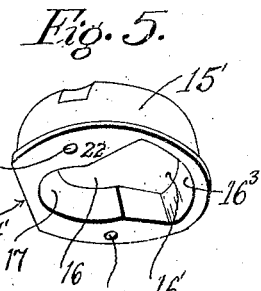
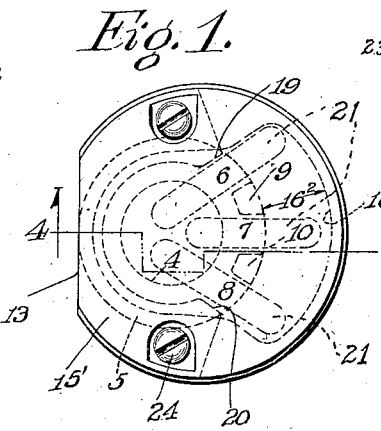
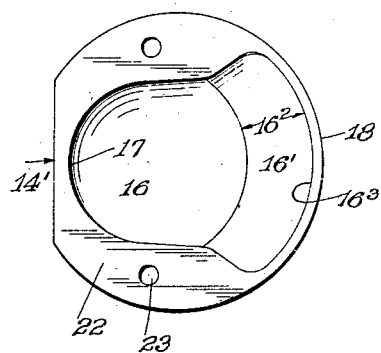
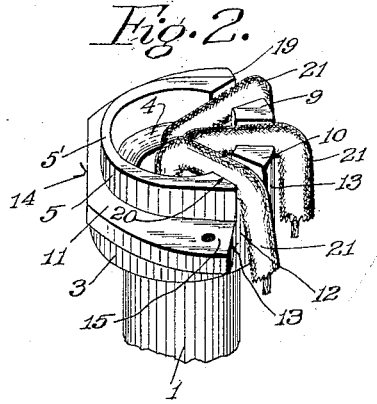
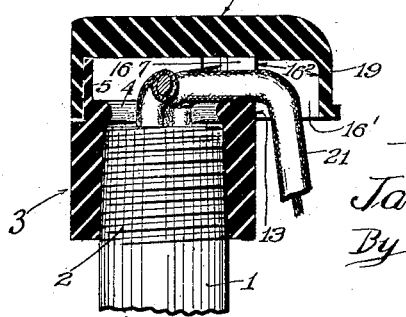
Inventor:
James C. Phelps.
By Harry W. Bown.
Attorney.

UNITED STATES PATENT OFFICE.

JAMES C. PHELPS, OF SPRINGFIELD, MASSACHUSETTS.

OUTLET DEVICE FOR CONDUITS.

1,294,155.     Specification of Letters Patent.     Patented Feb. 11, 1919.

Application filed March 7, 1917. Serial No. 153,052.

*To all whom it may concern:*

Be it known that I, JAMES C. PHELPS, a citizen of the United States of America, residing in the city of Springfield, county of Hampden, and State of Massachusetts, have invented certain new and useful Improvements in Outlet Devices for Conduits, of which the following is a specification.

This invention relates to improvements in attachments to electric conduits, particularly it is a device that is adapted to be secured to the end of the conduit either for permitting the wires or cables to enter the end of the conduit or to extend therefrom, as may be desired. These devices are sometimes known in the trade as "caplets" or "terminal fittings" for electric conduits.

The object of the invention is to provide a device which will readily permit electric wires or cables, especially where the cables are large and more or less rigid, to be easily drawn through the conduit with a straight pull on the part of the workman as distinguished from those devices where it is necessary to bend the wires or cables during the pulling or drawing-in operating, which results in consuming a longer time to install the fittings and also is liable to tear or scratch the insulation from the wire resulting in poor construction and leaving the cables so that there is danger from short circuits.

The device, broadly, comprises two members, one a base member which is formed with a threaded opening therein to receive the threads on the end of the conduit for attaching the same to a conduit. The upper portion of this base member is formed with projections, or rib portions that are concentric with the threaded portion of the base member to form notches therebetween for the purpose of separating and spreading the electric wires or cables as they leave or enter the fitting; the other member is a cap-piece having a recessed under surface which is designed to be attached to the base member and placed over the end of the conduit and also over the ends of the cables as they leave or enter the conduits, whereby foreign substances are prevented from entering the conduit and the cables are protected from rain or snow.

Referring to the drawings:

Figure 1 is a top plan view of the assembled device or structure showing the upper side of the upper member in full lines, the recesses in full lines for receiving the screws which hold the members together, and, in dotted lines the recessed portion in the upper or roof part of the cap member, and in dotted lines the projections or extensions on the lower member which form the cable receiving grooves in these projections or extensions;

Fig. 2 is a perspective view of a portion of the upper end of the conduit, with lower member attached thereto and showing three of the electric cables in place, the cables being separated by the projections which serve to form the grooves;

Fig. 3 is a bottom plan view of the cover showing the hollow or recessed portion into which the projections or extensions on the base member extend when the cap and base member are assembled;

Fig. 4 is a vertical sectional view of Fig. 1 taken in a plane on the line 4—4 through the axis of the conduit and one of the grooves between two of the wire separating projections.

Fig. 5 is a perspective view of the cap showing the recessed or hollowed out portion;

Fig. 6 is a plan view of the base-member showing the projections, recesses, and concentric rib or projection.

Referring to the drawings in detail: 1 designates the conduit, usually of metal, or some fibrous material, the upper end of which is formed with threads 2. The base member of the caplet is indicated at 3 which is formed with an internal threaded opening to receive the threads of the conduit for attaching the device to the conduit. Adjacent the threaded portion of the base member is a bead or bushing 4 and extending upward from the beaded portion is a circular projection, extension, or rib 5 which is formed concentric with the opening through the lower part of the base member. This projection is formed with a group of openings, passageways or grooves 6, 7, and 8 that extend from the upper edge 5' of the projection downward to a horizontal plane that corresponds substantially with the upper edge of the beaded portion, as will appear from Fig. 4. These openings are located only at the front side of the projection. The cable-receiving openings 6, 7, and 8 and the cable-separating projections 9 and 10, which are integral with the base member, are located adjacent what may be termed the "front side" of the base member. Adjacent the projection 5 is a ledge or platform portion 11. Substantially one half of the forward portion of the ledge or platform member 11 is cut away as indicated at 12. (See Figs. 2 and 6.) The forward ends of the ledge portion 11 merges into the front curved surface 13 of the projection 5 which projection is concentric with the axis of the conduit. The rear side of the ledge portion 11 is made with a flat or straight surface 14 for the purpose of causing the device to rest firmly against a wall or other support when the fitting and conduit is clamped to a fixed support. 15 are threaded openings in the ledge portion for receiving screws which serve to secure the cap to the base-member.

Referring now to the construction of the cap or upper member 15', a bottom plan view of which is shown in Fig. 3 and a sectional view in Fig. 4. A perspective view is shown in Fig. 5. This cap, as shown, is formed with a large hollowed out or recessed portion 16, the rear marginal surface 17 of which is concentric with the axis and of the same radius of curvature as the projection 5 on the base member 3, shown in Fig. 2. The forward part of the recessed portion 16 is formed on an arc that is concentric with the forward outer edge 18 of the cap and extends for a distance equal to that between the ends 19 and 20 of the projection 5 which ends, as stated, merge into the front curved surface 13 of the projection 5. The recessed portion 16 extends forward into the enlarged recessed portion 16' at the forward lower edge of the cover, or cap, and is nearly of the same depth as the portion 16, as clearly shown in Fig. 4. This enlarged recessed portion permits the wires or cables 21 to have a free and unobstructed passageway as they emerge from the beaded portion 4 of the base member and extend forward through the passageways or recesses 6, 7, and 8 of the outlet end of the conduit. The distance $16^2$ from the front surface 13 of the projection 5 to the curved surface $16^3$ is such that there will be sufficient room for the cables 21 to freely pass therethrough (see Fig. 4), and, the length of the arcuate surface $16^3$ is sufficient to permit the wires or cables to be readily separated from each other as shown in Fig. 2. The lower side of the cap is formed with a flat bearing surface 22 through which passes the screw-receiving openings 23 for attaching the cap to the base member. The flat surface 22 engages and rests firmly upon the flange or ledge portion 11 of the base member when the parts are assembled, as clearly shown in Fig. 4 and the upper edge 5' of the projection 5 will engage the upper recessed portion 16 of the cap. The cap will, therefore, be firmly secured to and will rest upon the base member when the screws 24 are tightened. The curvature of the inner rear portion of the recess 16 corresponds in radius with the curvature of the projection 5 whereby when the cap 15' is placed on the ledge it will be firmly and accurately positioned. The rear side of the cap 15' is also formed with a flat or straight surface 14' which coincides with and is in the same vertical plane as the flat surface 14 of the base piece.

From this construction it will be seen that after the base member 3 is secured in place on the conduit the wires or cables can be readily drawn through the conduit with a straight pull. They are then bent over into the position shown in Fig. 2, and pass out through the passageways or grooves 6, 7, and 8 between the projections 9 and 10. To complete the operation the cap 15 is then secured in place by means of the screws 24. This construction is one that is convenient for the operator to install and should repairs be necessary the cap 15' can be readily removed.

What I claim is:

1. In a device of the kind described, the combination, a tubular base-piece formed with an internal threaded opening therein for attachment to the threaded end of an electric conduit, integral projections constituting a part of the base-piece and extending in the direction of the axis of the conduit and concentric therewith, a portion of one of the said projections being located adjacent an annular flange or ledge, said projections on the front side of the base-member having vertical openings for separating or spreading the wires or cables as they leave, or enter, the end of the conduit through the base-member, a cap adapted to be placed on the base-piece and having its under side formed with an open unobstructed recess, the rear part of the recess being formed to engage the outer rear vertical surface only of a portion of the projections and its lower edge engaging the annular ledge, said ledge extending partially around the base piece and the vertical openings being located between the ends of the ledge, said recess extending forward a sufficient distance outward to receive the wires on the front side only as they leave, or enter, the openings, and means for securing the cap to the base piece.

2. A device of the kind described, comprising a base and cap member, the base-member having a threaded opening therein, a shouldered part to receive the threaded end of the conduit, and integrally formed axially extending projections, or flange portions, the front side of a portion of said projections being formed with openings therein for separating the wires, the base member having a ledge with spaced ends and located outside of the projections, the cap member having a hollowed out or recessed portion to loosely receive the projections on the base-member and its lower edge engaging the ledge, the hollowed out portion of the cap member extending beyond the ends of the ledge to receive the wires after they leave the openings, and the space between the ends of the ledge and the forward part of the hollowed out part of the cap-member permitting the wires to be bent downward under the extended hollowed out portion of the cap member, and means for attaching the base-piece and cap member together.

3. In a caplet construction the combination of base and cap members, the rear side of both of said members having a flat portion adapted to bear against the wall or fixed support, the base member having a horizontal outwardly projecting flange or ledge portion that terminates with spaced ends at the front side of the base member, and on which the lower edge of the cap member rests and integral spaced projections on the front side only of the base-piece and between the ends of the flange to form grooves in which the wires are located and for spreading or separating the same, the cap-member having a recessed unobstructed or hollow portion to receive the projections above the ledge, whereby the wires may be retained below the upper edge of the projections and confined in the grooves and are free from contact with the upper recessed portion of the cap member and means passing through the base and cap members for attaching the base and cap members together.

4. The combination in a device of the class described, a base member formed with a threaded opening to receive the conduit, projections on the base-member and concentric with the axis of said member the projections on the forward part of the base member constituting a group having openings therebetween to separate and receive the wires, an outwardly extending ledge co-extensive with the remaining projection, a cap member formed with a recessed or hollowed out unobstructed portion on the lower side and into which the projections extend, said recessed portion of the cap extending outward beyond the forward side only of the grouped projections to provide spaces to receive the wires as they emerge from the openings, as described, and means for attaching said members together.

5. A device of the kind described, comprising in combination with the outlet end of an electric conduit, of a base and cap member, means to secure the base-member to the conduit, said base member being provided with a group of spaced projections on one side only of the same for spacing and grouping the wires as they emerge from the conduit, an outwardly projecting horizontal ledge having a cut away part to permit the wires to be bent downward into positions that are substantially parallel with the axis of the conduit, the cap member engaging the ledge, said cap member having a recessed part to receive the projections and wires for the purpose specified.

6. A device of the kind described, comprising, in combination with an electric conduit, a base-member, means for attaching said member to the conduit, the base-member having a rib concentrically arranged about its axis and which extends from the rear side of said member toward the front part of the same where its ends are spaced from each other, and a concentric outwardly extending ledge co-extensive with the rib, a group of spaced projections between the ends of the rib and the ledge to provide openings for spacing the wires as they emerge from the conduit, a cap-member to receive the projections and engaging the ledge, and means for securing the members together.

JAMES C. PHELPS.

Copies of this patent may be obtained for five cents each, by addressing the "Commissioner of Patents, Washington, D. C."